US008924965B2

(12) United States Patent
Tsirkin et al.

(10) Patent No.: US 8,924,965 B2
(45) Date of Patent: Dec. 30, 2014

(54) MEMORY STATE TRANSFER OF VIRTUAL MACHINE-CONTROLLED PERIPHERALS DURING MIGRATIONS OF THE VIRTUAL MACHINE

(75) Inventors: Michael S. Tsirkin, Yokneam Yillit (IL); Dor Laor, Tel Aviv (IL); Avi Kivity, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 591 days.

(21) Appl. No.: 12/986,636

(22) Filed: Jan. 7, 2011

(65) Prior Publication Data

US 2012/0180043 A1 Jul. 12, 2012

(51) Int. Cl.
G06F 9/455 (2006.01)
G06F 9/50 (2006.01)

(52) U.S. Cl.
CPC ............ *G06F 9/455* (2013.01); *G06F 9/45533* (2013.01); *G06F 9/5088* (2013.01)
USPC .......................................................... 718/1

(58) Field of Classification Search
None
See application file for complete search history.

(56) References Cited

U.S. PATENT DOCUMENTS

| 8,086,821 | B2 | 12/2011 | Mukherjee et al. | |
|---|---|---|---|---|
| 2005/0268298 | A1 | 12/2005 | Hunt et al. | |
| 2007/0204265 | A1* | 8/2007 | Oshins | 718/1 |
| 2008/0133709 | A1* | 6/2008 | Aloni et al. | 709/218 |
| 2009/0119663 | A1 | 5/2009 | Mukherjee et al. | |
| 2009/0125904 | A1 | 5/2009 | Nelson | |
| 2009/0249366 | A1* | 10/2009 | Sen et al. | 719/327 |
| 2010/0250883 | A1* | 9/2010 | Oshida | 711/162 |
| 2011/0084973 | A1* | 4/2011 | Masood | 345/506 |
| 2011/0213911 | A1 | 9/2011 | Eidus et al. | |
| 2011/0321041 | A1 | 12/2011 | Bhat et al. | |

OTHER PUBLICATIONS

Live Migration of Direct-Access Devices Asim Kadav and Michael M. Swift Published: 2009.*
Live Migration with Pass-through Device for Linux VM Edwin Zhai, Gregory D. Cummings, and Yaozu Dong Published: 2008.*
USPTO, Office Action for U.S. Appl. No. 12/986,619 mailed May 24, 2012.
USPTO, Notice of Allowance for U.S. Appl. No. 12/986,619 mailed Sep. 13, 2012.
USPTO, Office Action for U.S. Appl. No. 12/986,629 mailed Mar. 4, 2013.
USPTO, Final Office Action for U.S. Appl. No. 12/986,629 mailed Jun. 25, 2013.
USPTO, Advisory Action for U.S. Appl. No. 12/986,629 mailed Sep. 13, 2013.

* cited by examiner

*Primary Examiner* — Emerson Puente
*Assistant Examiner* — Paul Mills
(74) *Attorney, Agent, or Firm* — Lowenstein Sandler LLP

(57) ABSTRACT

A mechanism for memory change tracking during migration of a virtual machine (VM) with VM-controlled assigned peripherals is disclosed. A method of the invention includes interacting with a VM executed by a hypervisor of a origin host machine in order to cause the VM to prevent a state of a peripheral device controlled by the VM from changing, receiving the state of the peripheral device from at least one of the VM, a memory of the VM, or the peripheral device, and transferring the obtained state of the peripheral device to a destination host machine as part of a migration process of the VM.

15 Claims, 5 Drawing Sheets

MEMORY STATE TRANSFER OF VIRTUAL MACHINE-CONTROLLED PERIPHERALS DURING MIGRATIONS OF THE VIRTUAL MACHINE

RELATED APPLICATIONS

The present application is related to co-filed U.S. patent application Ser. No. 12/986,629 entitled "Mechanism for Memory Change Tracking During Migration of Virtual Machine (VM) with VM-Controlled Assigned Peripherals", which is assigned to the assignee of the present application, and is related to co-filed U.S. patent application Ser. No. 12/986,619 entitled "Mechanism for Memory State Restoration of Virtual Machine (VM)-Controlled Peripherals at a Destination Host Machine During Migration of the VM", which is assigned to the assignee of the present application.

TECHNICAL FIELD

The embodiments of the invention relate generally to virtualization systems and, more specifically, relate to a mechanism for memory state transfer of virtual machine (VM)-controlled peripherals during migration of the VM.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a virtual machine monitor (VMM) manages allocation and virtualization of computer resources and performs context switching, as may be necessary, to cycle between various VMs.

A host machine (e.g., computer or server) is typically enabled to simultaneously run multiple VMs, where each VM may be used by a local or remote client. The host machine allocates a certain amount of the host's resources to each of the VMs. Each VM is then able to use the allocated resources to execute applications, including operating systems known as guest operating systems. The VMM virtualizes the underlying hardware of the host machine or emulates hardware devices, making the use of the VM transparent to the guest operating system or the remote client that uses the VM.

Often times, a VM may need to be migrated from one host machine to another host machine for a variety of reasons. This migration process may be a "live" migration process, referring to the fact that the VM stays running and operational (i.e., "live") during most of the migration process. During live migration, the entire state of a VM is transferred from one host machine to another host machine. A critical piece of this transmission of state is the transfer of memory of the VM. The entire memory of a VM can often times fall in the order of gigabytes, which can result in a length live migration transfer process. In addition, because the VM is "live" during this transfer, memory may become "dirty" during the transfer. This means that a particular page of the memory that was already transferred has been modified on the VM that is still residing on the source host. Typically, these "dirty" pages are marked so that those particular pages of memory can be transferred again during the live migration process.

One problem with the current state of live migration occurs when a VM has an assigned peripheral device that is solely controlled by the VM. The control of this peripheral device is accomplished by means of a device-specific driver loaded in the VM. The host machine may either not have that device-specific driver or not have support for such an emulated device in the hypervisor. In such a case, this device can only be assigned to one VM on the host machine to control because there is not simple way to synchronize the device with other VMs so that they can also utilize the device.

If a VM with a VM-controlled peripheral device is to be migrated to another hypervisor, a variety of issues may occur when trying to migrate the device and its memory state to another hypervisor. One problem with migration of VM-assigned peripheral devices is that some of the memory state is stored in the peripheral device and not in the VM memory. It is unknown what this state is because the host machine does not have simple access to it. Another problem is that the VM-controlled peripheral device may modify the VM memory, and these modifications are not normally tracked by the hypervisor, making it difficult to identify dirty memory. Yet another problem resulting from migration of VM-controlled peripheral devices is in correctly placing the peripheral device on the destination host machine system in the same state as it was on the origin host machine system.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
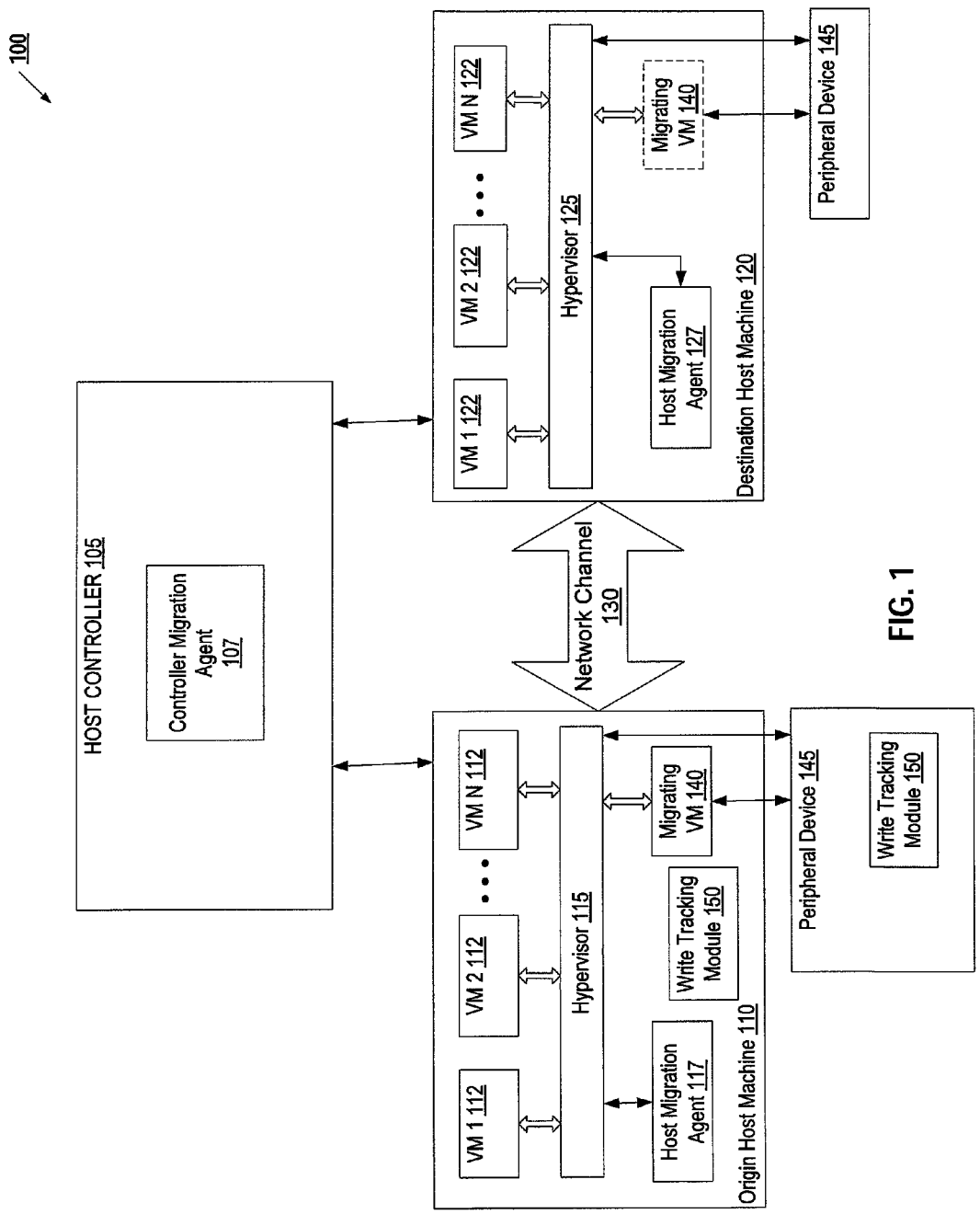
FIG. 1 is a block diagram of an exemplary virtualization architecture in which embodiments of the present invention may operate.

Embodiments of the invention provide a mechanism for memory state transfer of virtual machine (VM)-controlled peripherals during migration of the VM. A method of embodiments of the invention includes interacting with a VM executed by a hypervisor of a origin host machine in order to cause the VM to prevent a state of a peripheral device controlled by the VM from changing, receiving the state of the peripheral device from at least one of the VM, a memory of the VM, or the peripheral device, and transferring the obtained state of the peripheral device to a destination host machine as part of a migration process of the VM.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "interacting", "transferring", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for memory state transfer of VM-controlled peripherals during migration of the VM. In one embodiment, a solution is provided to aid in retrieving memory state of the peripheral to be transferred to a destination host machine. In such a case, the origin host machine hypervisor may use a variety of techniques to retrieve the state of the peripheral for transfer. For instance, the origin hypervisor may use a VM channel to request the peripheral state from the VM. The VM will stop the peripheral and then retrieve the state in order to provide it to the hypervisor. In another case, the hypervisor may retrieve the state directly from the VM memory via a suspend to memory operation. In yet another case, the hypervisor may retrieve the state directly through a query to the peripheral, with or without the cooperation of the VM.

FIG. 1 illustrates an exemplary virtualization architecture 100 in which embodiments of the present invention may operate. The virtualization architecture 100 may include one or more host machines 110, 120 to run one or more virtual machines (VMs) 112, 122. Each VM 112, 122 runs a guest operating system (OS) that may be different from one another. The guest OS may include Microsoft Windows, Linux, Solaris, Mac OS, etc. The host 110, 120 may include a hypervisor 115, 125 that emulates the underlying hardware platform for the VMs 112, 122. The hypervisor 115, 125 may also be known as a virtual machine monitor (VMM), a kernel-based hypervisor or a host operating system.

In one embodiment, each VM 112, 122 may be accessed by one or more of the clients over a network (not shown). The network may be a private network (e.g., a local area network (LAN), wide area network (WAN), intranet, etc.) or a public network (e.g., the Internet). In some embodiments, the clients may be hosted directly by the host machine 110, 120 as a local client. In one scenario, the VM 112, 122 provides a virtual desktop for the client.

As illustrated, the host 110, 120 may be coupled to a host controller 105 (via a network or directly). In some embodiments, the host controller 105 may reside on a designated computer system (e.g., a server computer, a desktop computer, etc.) or be part of the host machine 110, 120 or another machine. The VMs 112, 122 can be managed by the host controller 105, which may add a VM, delete a VM, balance the load on the server cluster, provide directory service to the VMs 112, 122, and perform other management functions.

In one embodiment, host controller 105 may include a controller migration agent 107 that is responsible for migration of a VM 122 between host machines 110, 120 via network channel 130. In addition, each host machine 110, 120 may include a host migration agent 117, 127 to assist controller migration agent 107 in the migration process, or to handle the migration process directly themselves. Migration agent 107, 117, 127 make a determination of which host machine 110, 120 to place a VM 112, 122 when it is migrated. In a virtualization system 100, it is important to schedule (also referred to as selection or placement) VMs 112, 122 on the "best host" 110, 120 for the job. There are various considerations for selecting the "best host". In one embodiment, migration agent 107, 117, 127 utilizes a general selection algorithm that considers a variety of factors for placement of a VM.

For purposes of the following explanation, host machine 110 may be known as the origin host machine 110 from which a VM 140 is migrating from, and host machine 120 may be known as the destination host machine 120 to which the VM 140 is migrating to. Assume VM 140 on origin host machine 110 is live migrating to destination host machine 120. In embodiments of the invention, when it is decided to initiate a live migration process for VM 140 between origin host machine 110 and destination host machine 120, the state of VM 140 will be transferred between the two host machines 110, 120. VM 140 remains operational on origin host machine 110 during this transfer of state.

As shown in FIG. 1, the migrating VM includes an assigned VM-controlled peripheral device 145. In some embodiments, this device may be a network device, or some other device that the hypervisor 115 cannot emulate for the VM 140. The VM 140 includes a device-specific driver in order to control the assigned peripheral device 145. In any case, the hypervisor will not have any control of this peripheral device 145 and will not be aware of any changes to this device 145 makes to the memory or state of the VM 140.

As such, embodiments of the invention provide a solution to aid in the migration process when a VM-controlled peripheral device 145 is present. In one embodiment, a solution is provided for memory tracking purposes to notify the origin hypervisor 115 when the peripheral device 145 modifies VM memory so that migration of this page of VM memory can be repeated. In another embodiment, a solution is provided to retrieve the internal state of the VM-controlled peripheral device 145 and migrate this state from the origin host machine 110 to the destination host machine 120. Lastly, in yet another embodiment, a solution is provided to put the peripheral device 145 into the same internal state on the migrated VM 140 of the destination host machine 120 as it had on the origin host machine 110.

With respect to tracking changes to VM 140 memory made by the VM-controlled peripheral device 145, embodiments of the invention provide a write tracking module 150 to notify the origin hypervisor 115 when the peripheral device 145 modifies VM memory so that migration of this page of VM memory can be repeated. Specifically, the origin hypervisor 115 informs the write tracking module 150 that it is interested in writes to a specific memory location of the VM 140. In one embodiment, this targeted memory location may be the memory area assigned to the peripheral device for its particular use. Then, in turn, the write tracking module 150 notifies the hypervisor 115 each time a Direct Memory Access (DMA) write that targets the identified memory of interest has been completed.

In one embodiment, the write tracking module 150 may reside in the VM 140 and communicate with the hypervisor 115 to provide the notifications when the targeted memory has been modified. For example, the write tracking module 150 may be part of the device driver in the guest OS running on the VM. In another embodiment, the write tracking module may reside elsewhere in the origin host machine 110, such as in a host memory controller, a host bus controller, or in a bridge located between the peripheral device 145 and the host memory, to name a few examples. The hypervisor 115 can then access the write tracking module 150 or the write tracking module 150 may do DMA to obtain the memory change information.

In other embodiments, the write tracking module 150 may be part of the peripheral device 145. In this case, the hypervisor 115 may have a special peripheral communication channel established directly to the write tracking module 150 in the peripheral device 145 that the hypervisor 115 can use without interfering with the VM 140. The write tracking module 150 in the peripheral device 145 will directly notify the hypervisor 115 each time a DMA write that targets the identified memory of interest has been completed.

In some embodiments, the notification to the hypervisor 115 from the write tracking module 150 when it is located in the peripheral device 145 may be accomplished by either (1) the hypervisor 115 retrieving the information from one or more registers of the peripheral device 145, or (2) by the write tracking module 150 in the peripheral device 145 sending the information to hypervisor 115. In the first scenario (if the hypervisor 115 accesses the information from the write tracking module 150 in the peripheral device), the write tracking module 150 in the peripheral device 145 sends an interrupt to the hypervisor 115 and, in response, the hypervisor accessing the registers of the peripheral device 145 to determine what occurred. In the second scenario, (if the write tracking module 150 in the peripheral device 145 sends the information to the hypervisor 115), the data is sent via the special peripheral channel that is not under control of the VM 140. In the case of multiple VM-controlled peripheral devices 145 being associated with the VM, a specific interface that the hypervisor 115 uses to retrieve the memory change information from the write tracking modules 150 of the peripherals 145 may be standardized and identical for each of the different types of peripheral devices 145.

With respect to transferring memory state of the VM-controlled peripheral device 145 from the origin host machine 110 to the destination host machine 120, embodiments of the invention provide multiple variants to accomplish this transfer of peripheral device 145 memory state for migration purposes. The transfer of the state of the peripheral device occurs when it is time to move and establish the peripheral device on the destination host machine. The state of the peripheral device 145 will typically be quite small, and as such, should not take long to migrate to the destination host machine 120.

In one embodiment, the origin hypervisor 115 requests the state of the peripheral device 145 from the VM 140 via a special VM-to-hypervisor channel. This embodiment takes advantage of the fact that the VM has sole control over the peripheral and as such can stop the peripheral and provide its state to the hypervisor 115. In this case, the VM 140 makes sure that peripheral device 145 is stopped so that its state will not subsequently change. Then, the VM 140 retrieves state from the peripheral device 145 and responds directly to the hypervisor 115 with the peripheral device's 145 state over the special VM-to-hypervisor channel. At this point, the peripheral device 145 state is migrated to the destination host machine 120 separately from memory.

In another embodiment, the hypervisor obtains the peripheral device 145 state through the VM's memory. This is similar to the VM 140 sending the state directly to the hypervisor 115 above, except that in this case the VM 140 stores the peripheral state to VM memory in order for the hypervisor 115 to access. Because the hypervisor 115 typically tracks all memory changes by the VM during the migration process, the hypervisor 115 will see the VM 140 save the state to memory and migrate this modification. In this case, the hypervisor 115 can simply send a generic 'suspend to memory' request to the VM 140. The VM then makes sure that the peripheral device 145 is stopped so that its state does not subsequently change. Then, the VM 140 retrieves the peripheral state from the peripheral device 145 and saves this to VM memory. As all VM memory is migrated to destination host machine 120 as part of migration process, the peripheral device's state will also be migrated with it.

In some embodiments, the 'suspend to memory' request may be accompanied by a list of assigned peripherals whose state needs to be accessed. This might cause the VM to only save the state of the relevant peripheral devices on the list to the memory, and leave any other peripherals and other state of the VM unaffected. For example, such a targeted suspend to memory would not disconnect existing TCP connections, while a general suspend to memory might disconnect these TCP connections.

In another embodiment, the peripheral device 145 state is transferred by the peripheral device 145 to the hypervisor 115 with the cooperation of the VM 140. In this case, the hypervisor 115 requests that the VM 140 save the state of the peripheral device 145. The VM 140 then makes sure that the peripheral device 145 is stopped so that its state will not subsequently change. Then, the hypervisor 115 queries the peripheral device 145 directly for its state. In one embodiment, this communication may occur via a special peripheral communication channel established between the hypervisor 115 and peripheral device 145. The device 145 responds to the hypervisor 115 with its state, which is migrated to the destination host machine 120 separately from the VM memory.

In a further embodiment, the peripheral device 145 state is transferred by the peripheral device 145 to the hypervisor 115 without the cooperation of the VM 140. In this scenario, the hypervisor 115 blocks the VM 140 from accessing the peripheral state. In one embodiment, blocking the VM 140 is accomplished by stopping all VM virtual CPUs. In other embodiment, blocking the VM 140 from accessing the peripheral state is accomplished by stopping a VM virtual CPU when the VM 140 attempts to prevent an action that will affect the state of the peripheral device 145. At this point, the hypervisor 115 will directly query the peripheral device 145 for its state. In one embodiment, this communication may occur via a special communication channel (not shown) established between the hypervisor 115 and peripheral device 145. The device 145 responds to the hypervisor 115 with its state, which is migrated to the destination host machine 120 separately from the VM memory.

With respect to memory state restoration of VM-controlled assigned peripheral at a destination host machine during migration of the VM, embodiments of the invention provide multiple variants to accomplish this memory state restoration on the destination host machine. Restoration of the state of the peripheral device at the destination host machine occurs at the end of the migration process when the peripheral device state has already been transferred to the host machine. Establishing this state in the peripheral device 145 being established at the migrated VM 140 on the destination host machine 120 is the concern here.

In one embodiment, the peripheral device 145 state is restored directly through a VM communication channel with the hypervisor 125. In this scenario, the peripheral device state is passed from the destination hypervisor 125 to the VM 140 through a special VM-to-hypervisor channel (not shown). The VM 140 will then place the peripheral device 145 into its appropriate state and allow the peripheral device to run.

In another embodiment, the peripheral device 145 state is restored via the memory of the VM 140. In this case, the hypervisor 125 places the peripheral state into VM memory and then notifies the VM 140 that the peripheral device 145 is ready to be run. Then, the VM 140 retrieves peripheral state from its memory and puts the peripheral device 145 into its appropriate state. Then, the VM 140 allows the peripheral device 145 to run.

In a further embodiment, the peripheral device 145 state is restored directly at the peripheral with the cooperation of the VM. In this case, the hypervisor 125 puts the peripheral device 145 in the state that was received from origin host machine 110. In one embodiment, this may be accomplished via a special peripheral communication channel established between the hypervisor and peripheral device. Once the peripheral device 145 is placed in its restored state, the hypervisor 125 notifies the VM 140 that the peripheral device 145 can run and the VM 140 allows the peripheral device 145 to run.

In yet a further embodiment, the peripheral device 145 state is restored directly at the peripheral without the cooperation of the VM 140. This can be accomplished in one of 2 ways. In one scenario, the peripheral state is restored before any virtual CPUs of the VM 140 are started. In another scenario, the peripheral state is restored before any virtual CPUs that attempt to perform an action that affects the peripheral state are started. Once the peripheral device 145 is placed in its restored state, the hypervisor 125 notifies the VM 140 that the peripheral device 145 can run and the VM 140 allows the peripheral device 145 to run.

Figure 2:
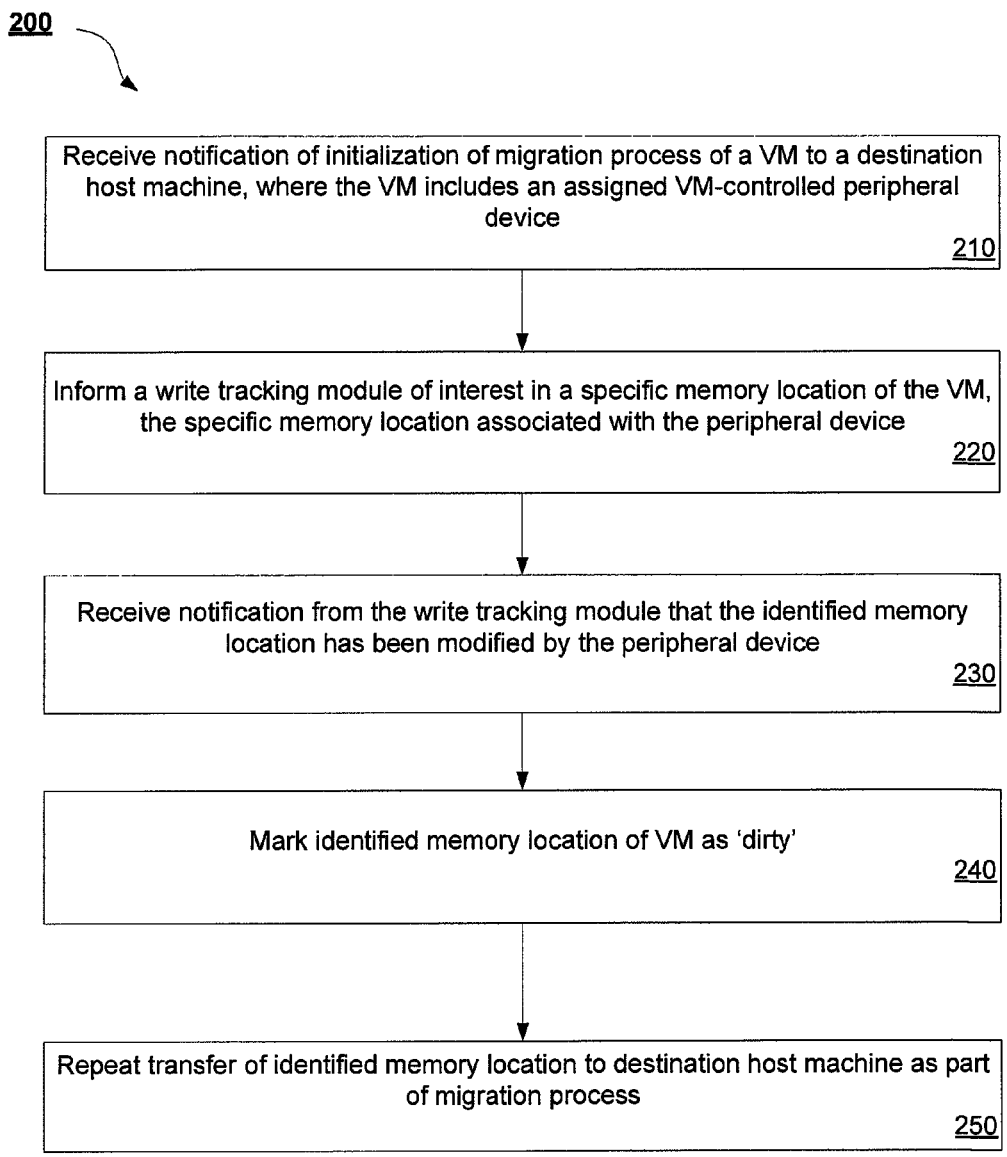
FIG. 2 is a flow diagram illustrating a method for memory change tracking during migration of a virtual machine (VM) with VM-controlled assigned peripherals according to an embodiment of the invention.

FIG. 2 is a flow diagram illustrating a method 200 for memory change tracking during migration of a virtual machine (VM) with VM-controlled assigned peripherals according to an embodiment of the invention. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by hypervisor 115 of origin host machine 110 of FIG. 1.

Method 200 begins at block 210 where the hypervisor receives notification that a migration process is being initialization of a VM that it manages to a destination host machine. In one embodiment, this notification may come from a migration agent of a host controller and/or of the hypervisor's host machine. In one embodiment, the VM to be migrated includes an assigned VM-controlled peripheral device that the hypervisor has not control over.

Then at block 220, the hypervisor informs a write tracking module of an interest by the hypervisor in a specific memory location of the VM. In one embodiment, this targeted memory location may be the memory area assigned to the peripheral device for its particular use. In one embodiment, the write tracking module is located in the origin host machine, for example, in the VM itself, in the host memory controller, in the host bus controller, or in a bridge located between the peripheral and the host memory. In other embodiments, the write tracking module may be located in the peripheral device. In the case of the write tracking module being located in the peripheral device, the hypervisor may have a special peripheral communication channel established directly to write tracking module in the peripheral device that it may use without interfering with the VM. Access from the VM to this special peripheral communication channel is trapped by hypervisor.

Subsequently, at block 230, the hypervisor receives notification from the write tracking module that the identified memory location has been modified by the peripheral device. The write tracking module will provide the hypervisor notification each time that a DMA write that targets the identified memory of interest has been completed. If the write tracking module is located on the peripheral device, the notification to the hypervisor may be accomplished by means of the hypervisor retrieving the information from one or more registers of the peripheral device, or by the write tracking module of the peripheral device sending the information to hypervisor. If the hypervisor accesses the information from the write tracking module on the peripheral device, this can be accomplished by the write tracking module sending an interrupt to the hypervisor and, in response, the hypervisor accessing the registers of the peripheral device to determine what occurred. If the write tracking module sends the information to the hypervisor, the data is sent via the special peripheral channel that is not under control of the VM.

Then, at block 240, the hypervisor marks the identified memory location that has been modified by the peripheral device as 'dirty'. Lastly, at block 250, the transfer of the 'dirty' identified memory location to the destination host machine as part of the migration process is repeated.

Figure 3:
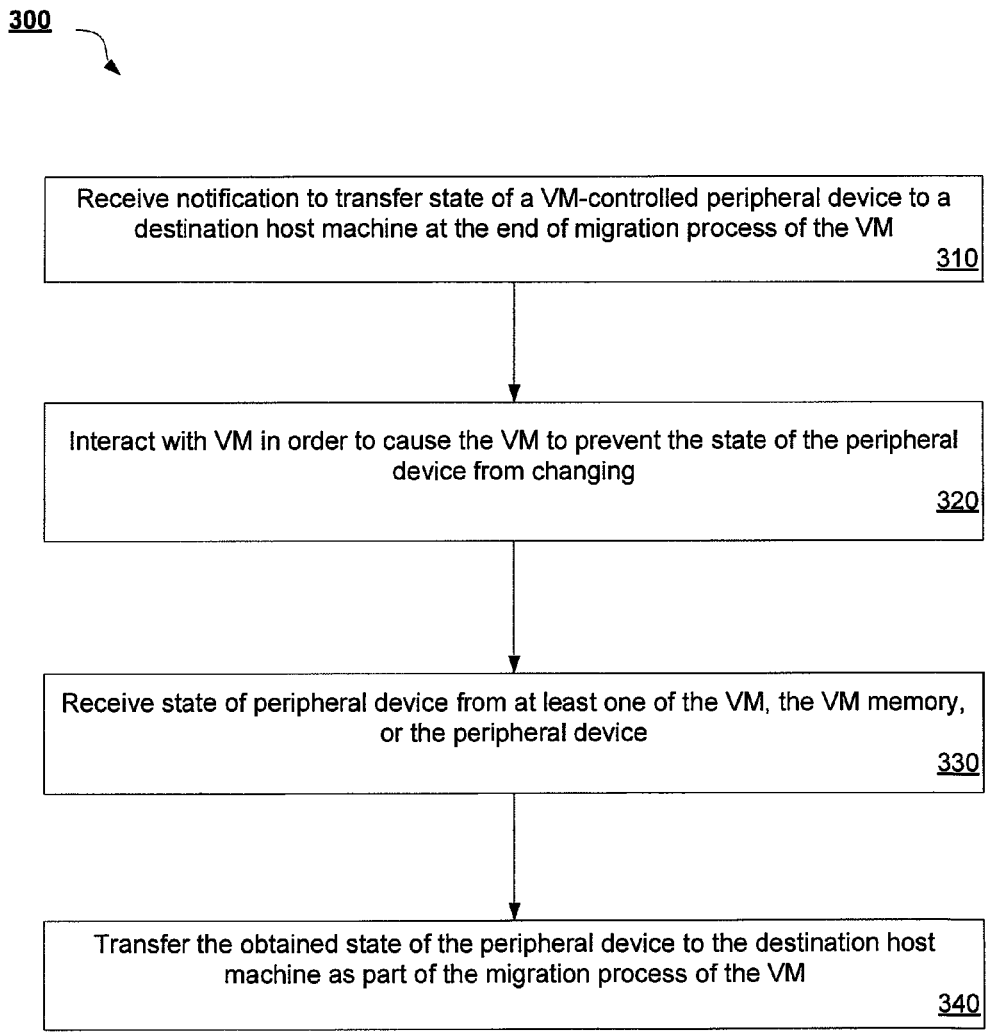
FIG. 3 is a flow diagram illustrating a method for memory state transfer during migration of a VM with VM-controlled assigned peripherals according to an embodiment of the invention.

FIG. 3 is a flow diagram illustrating a method 300 for memory state transfer during migration of a VM with VM-controlled assigned peripherals according to an embodiment of the invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by hypervisor 115 of origin host machine 110 of FIG. 1.

Method 300 begins at block 310 where the hypervisor receives a notification to transfer the state of a VM-controlled peripheral device to a destination host machine. This notification is received at the end of the migration process of the VM. Then, at block 320, the hypervisor interacts with the VM in such a way as to cause the VM to prevent the state of the peripheral device from changing. In one embodiment, this interaction includes the hypervisor requesting the state of the peripheral device from the VM, which causes the VM to stop the peripheral device from operating. In another embodiment, this interaction includes immediately stopping all virtual CPUs of the VM from operating, or only stopping a virtual CPU of the VM from operating when the VM attempts to take an action that that will affect the peripheral state.

At block 330, the hypervisor then receives the state of the peripheral device from at least one of the VM, the VM memory, or the peripheral device. In one embodiment, the state of the peripheral device is received via a special VM-to-hypervisor channel. Upon stopping the peripheral device, the VM will then retrieve the peripheral state from the peripheral device and provide this state directly to the hypervisor over the special VM-to-hypervisor channel. In another embodiment, the hypervisor obtains the peripheral device state through the VM's memory. In this case, the hypervisor sends a generic 'suspend to memory' request to the VM, who then retrieves the peripheral state from the peripheral device and saves this to VM memory. The hypervisor can then access this VM memory to obtain the state of the peripheral device.

In some embodiments, the 'suspend to memory' request may be accompanied by a list of assigned peripherals whose state needs to be accessed. This might cause the VM to only save the state of the relevant peripheral devices on the list to the memory, and leave any other peripherals and other state of the VM unaffected. For example, such a targeted suspend to memory would not disconnect existing TCP connections, while a general suspend to memory might disconnect these TCP connections.

In another embodiment, the peripheral device state is obtained via a transfer by the peripheral device to the hypervisor with the cooperation of the VM. The hypervisor requests that the VM save the state of the peripheral device. After the VM stops the peripheral device from operating as provided in block 320, the hypervisor queries the peripheral device directly for its state. The device will then respond directly to the hypervisor with its state. In some embodiments, this direct communication between the hypervisor and the peripheral device is accomplished via a special peripheral communication channel established between the hypervisor and peripheral device.

In a further embodiment, the peripheral device state is obtained via a transfer by the peripheral device to the hypervisor without the cooperation of the VM. In this scenario, the hypervisor blocks the VM from accessing the peripheral state, as provided in block 320. Once the VM is blocked from accessing the peripheral device, the hypervisor directly queries the peripheral device for its state. The device responds to the hypervisor with its state. In some embodiments, this direct communication between the hypervisor and the peripheral device is accomplished via the above-described special peripheral communication channel established between the hypervisor and peripheral device.

Figure 4:
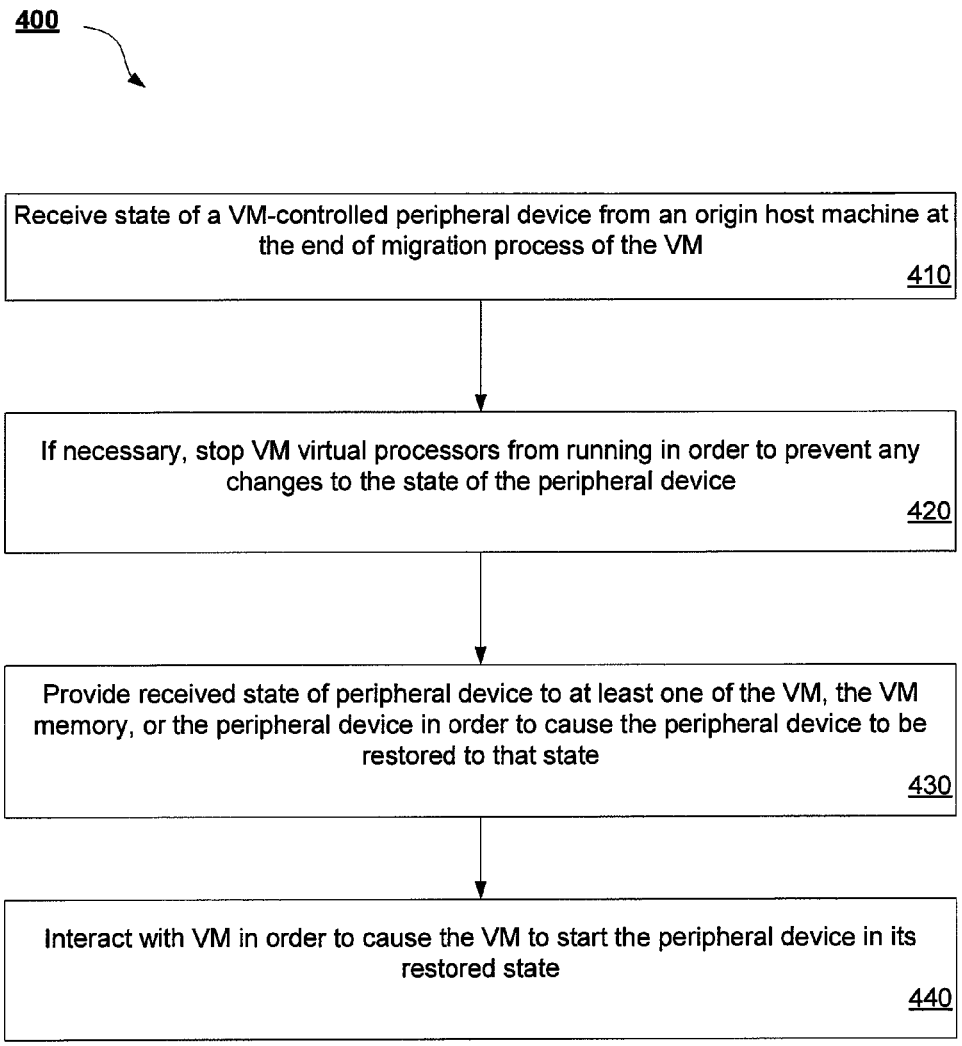
FIG. 4 is a flow diagram illustrating a method for memory state restoration of VM-controlled assigned peripheral at a destination host machine during migration of the VM according to an embodiment of the invention.

FIG. 4 is a flow diagram illustrating a method 400 for memory state restoration of VM-controlled assigned peripheral at a destination host machine during migration of the VM according to an embodiment of the invention. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by hypervisor 125 of destination host machine 120 of FIG. 1.

Method 400 begins at block 410 where the state of a VM-controlled peripheral device is received at a destination host machine from an origin host machine. Reception of the state of the peripheral device at the destination host machine occurs at the end of a migration process of the VM. Subsequently, at block 420, if necessary, one or more virtual processors of the VM are stopped from running in order to prevent any changes to the state of the peripheral device. This action will occur only in the case of restoring the state of peripheral device without the cooperation of the VM.

Then, at block 430, the received state of the peripheral device is provided to at least one of the VM, the VM memory, or the peripheral device. Providing the state to one of these entities will cause the peripheral device to be restored to the provided state. In one embodiment, the peripheral device state is provided directly to the VM for restoration through a special VM-to-hypervisor channel.

In another embodiment, the peripheral device state is restored via the memory of the VM. In this case, the hypervisor places the state into VM memory and then notifies the VM that the peripheral device is ready to be run. Then, the VM retrieves the peripheral state from its memory and puts the peripheral device into its appropriate state.

In a further embodiment, the peripheral device state is provided directly to the peripheral device. This may occur with or without the cooperation of the VM. In the scenario where the VM cooperates, the hypervisor places the peripheral device in the state that was received from origin host machine. This may be accomplished via a special peripheral communication channel established between the hypervisor and peripheral device. In the scenario where the VM does not cooperate, the virtual processors of the VM will be stopped at block 420. In one embodiment, the virtual processors are all stopped without any reason. In another embodiment, the virtual processors are stopped only when the VM attempts to perform an action that affects the peripheral state.

Lastly, at block 440, the hypervisor interacts with the VM in order to cause the VM to start the peripheral device. In one embodiment, interacting with the VM includes, the hypervisor notifying the VM that the peripheral device can run when the peripheral device is placed in its restored state via any of the various interaction prompted by the hypervisor.

Figure 5:
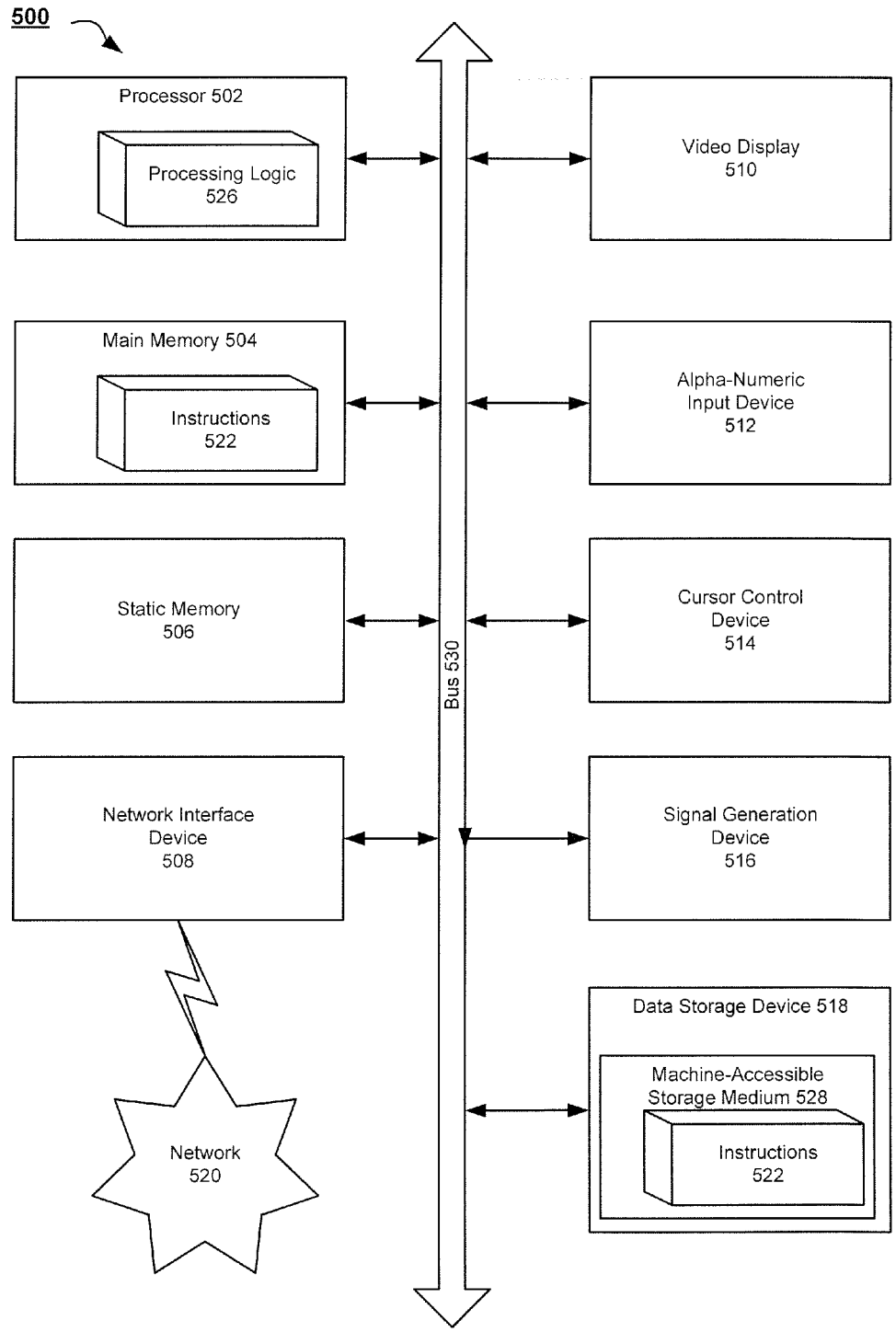
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528 on which is stored one or more set of instructions (e.g., software 522) embodying any one or more of the methodologies of functions described herein. For example, software 522 may store instructions to perform VM migration with VM-controlled assigned peripherals by virtualization architecture 100 described with respect to FIG. 1. The software 522 may also reside, completely or at least partially, within the main memory 504 and/or within the processing device 502 during execution thereof by the computer system 500; the main memory 504 and the processing device 502 also constituting machine-accessible storage media. The software 522 may further be transmitted or received over a network 520 via the network interface device 508.

The machine-readable storage medium 528 may also be used to store instructions to perform methods 200, 300, and 400 for VM migration with VM-controlled assigned peripherals described with respect to FIGS. 2, 3, and 4, and/or a software library containing methods that call the above applications. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method of transferring peripheral device state as part of a virtual machine migration, comprising:
   receiving, by a hypervisor of an origin host machine, a notification to transfer device state of a peripheral device controlled by a virtual machine (VM) to a destination host machine as part of a migration process of the VM;
   requesting, by the hypervisor in cooperation with the VM, the device state of the peripheral device from the VM in response to receiving the notification, wherein the VM stops the peripheral device from operating, retrieves the device state from the stopped peripheral device, and provides, separately from a memory state of the VM, the retrieved device state to the hypervisor via a VM-to-hypervisor communication channel in response to the request; and
   transferring, by the hypervisor, the provided device state to the destination host machine, wherein the device state is transferred separately from the memory state of the VM.

2. The method of claim 1, wherein the notification is received at the end of the migration process subsequent to transferring the memory state of the VM to the destination host machine.

3. The method of claim 1, wherein the hypervisor virtualizes hardware of the origin host machine for the VM.

4. The method of claim 1, wherein the destination host machine is selected via a general selection algorithm from a plurality of host machine to receive the VM via the migration process.

5. The method of claim 1, wherein the VM comprises a device-specific driver to control the peripheral device.

6. A system for transferring peripheral device state as part of a virtual machine migration, comprising:
   a processing device;
   a memory communicably coupled to the processing device; and
   a hypervisor to execute one or more virtual machines (VMs) from the memory that share use of the processing device, the hypervisor to:

receive a notification to transfer device state of a peripheral device controlled by a VM of the one or more VMs to a destination host machine as part of a migration process of the VM;

request, in cooperation with the VM, the device state of the peripheral device from the VM in response to receiving the notification, wherein the VM stops the peripheral device from operating, retrieves the device state from the stopped peripheral device, and provides, separately from a memory state of the VM, the retrieved device state to the hypervisor via a VM-to-hypervisor communication channel in response to the request; and transfer the provided device state to the destination host machine, wherein the device state is transferred separately from the memory state of the VM.

7. The system of claim 6, wherein the notification is received at the end of the migration process subsequent to transferring the memory state of the VM to the destination host machine.

8. The system of claim 6, wherein the hypervisor virtualizes hardware of the origin host machine for the VM.

9. The system of claim 6, wherein the destination host machine is selected via a general selection algorithm from a plurality of host machine to receive the VM via the migration process.

10. The system of claim 6, wherein the VM comprises a device-specific driver to control the peripheral device.

11. A non-transitory machine-readable storage medium including instructions that, when executed by a processing device, cause the processing device to perform operations for transferring peripheral device state as part of a virtual machine migration comprising:

receiving, by a hypervisor of an origin host machine comprising the processing device, a notification to transfer device state of a peripheral device controlled by a virtual machine (VM) to a destination host machine as part of a migration process of the VM;

requesting, by the hypervisor in cooperation with the VM, the device state of the peripheral device from the VM in response to receiving the notification, wherein the VM stops the peripheral device from operating, retrieves the device state from the stopped peripheral device, and provides, separately from a memory state of the VM, the retrieved device state to the hypervisor via a VM-to-hypervisor communication channel in response to the request; and transferring, by the hypervisor, the provided device state to the destination host machine, wherein the device state is transferred separately from the memory state of the VM.

12. The non-transitory machine-readable storage medium of claim 11, wherein the notification is received at the end of the migration process subsequent to transferring the memory state of the VM to the destination host machine.

13. The non-transitory machine-readable storage medium of claim 11, wherein the hypervisor virtualizes hardware of the origin host machine for the VM.

14. The non-transitory machine-readable storage medium of claim 11, wherein the destination host machine is selected via a general selection algorithm from a plurality of host machine to receive the VM via the migration process.

15. The non-transitory machine-readable storage medium of claim 11, wherein the VM comprises a device-specific driver to control the peripheral device.

\* \* \* \* \*